US006758520B2

United States Patent
Pehrson

(10) Patent No.: US 6,758,520 B2
(45) Date of Patent: Jul. 6, 2004

(54) ADJUSTABLE HEIGHT AUTOMOTIVE SEAT

(75) Inventor: Hans Olof Pehrson, Simi Valley, CA (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/755,928

(22) Filed: Jan. 5, 2001

(65) Prior Publication Data

US 2002/0089222 A1 Jul. 11, 2002

(51) Int. Cl.[7] .......................... B60N 2/427; B60N 2/16; B60R 21/02; A47C 20/00; A47C 7/50
(52) U.S. Cl. ............... 297/216.1; 297/339; 297/423.19; 297/423.2; 297/484
(58) Field of Search .................. 297/338, 339, 297/284.11, 423.19, 423.2, 423.22, 423.23, 423.24, 484, 216.11, 216.14, 216.1, 452.2

(56) References Cited

U.S. PATENT DOCUMENTS

| 3,832,002 A | * | 8/1974 | Eggert, Jr. et al. ....... 297/484 X |
| 3,902,755 A | * | 9/1975 | Sirot .......................... 297/339 |
| 4,040,660 A | * | 8/1977 | Barecki ................... 297/484 X |
| 4,410,215 A | * | 10/1983 | McKean et al. ....... 297/423.19 |
| 4,411,473 A | * | 10/1983 | Ettridge ...................... 297/484 |
| 4,564,238 A | * | 1/1986 | Wolpert, Jr. ......... 297/423.19 X |
| 4,652,053 A | * | 3/1987 | Mikami ....................... 297/484 |
| 4,743,066 A | * | 5/1988 | Boisset et al. ............... 297/339 |
| 4,919,488 A | * | 4/1990 | Deegener et al. ........ 297/484 X |
| 5,112,018 A | * | 5/1992 | Wahls ..................... 297/339 X |
| 5,143,421 A | * | 9/1992 | Voss et al. ............... 297/339 X |
| 5,507,562 A | * | 4/1996 | Wieland ................... 297/423.2 |
| 5,685,603 A | | 11/1997 | Lane, Jr. ................. 297/216.11 |
| 5,997,083 A | * | 12/1999 | Ono et al. ............... 297/339 X |
| 6,076,894 A | * | 6/2000 | Busch ........................ 297/484 |
| 6,095,610 A | * | 8/2000 | Okajima et al. ..... 297/423.2 X |
| 6,113,185 A | | 9/2000 | Yamaguchi et al. ...... 297/216.1 |
| 6,139,111 A | * | 10/2000 | Pywell et al. ................ 297/484 |
| 6,237,889 B1 | * | 5/2001 | Bischoff .............. 297/216.1 X |
| 6,237,945 B1 | * | 5/2001 | Aboud et al. ........... 297/484 X |
| 6,264,278 B1 | * | 7/2001 | Weimer et al. ..... 297/423.19 X |
| 6,296,292 B1 | * | 10/2001 | Feldman .............. 297/216.1 X |
| 6,302,482 B1 | * | 10/2001 | Moll et al. ............... 297/339 X |
| 6,450,573 B1 | * | 9/2002 | Yamaguchi et al. ..... 297/216.1 |
| 6,460,819 B1 | * | 10/2002 | Muhlberger et al. . 297/216.1 X |
| 2002/0047296 A1 | * | 4/2002 | Houston et al. ......... 297/216.1 |
| 2002/0053792 A1 | * | 5/2002 | Yamaguchi et al. . 297/216.1 X |
| 2002/0053793 A1 | * | 5/2002 | Yamaguchi et al. . 297/216.1 X |

FOREIGN PATENT DOCUMENTS

| DE | 44 12 617 A1 | 10/1994 |
| EP | 0 666 194 A1 | 12/1994 |
| EP | 0 689 955 A1 | 1/1996 |
| EP | 0 705 728 A2 | 4/1996 |
| EP | 0 827 863 A2 | 3/1998 |
| GB | 2 146 895 A | 5/1985 |
| JP | 10-16617 | 1/1998 |

* cited by examiner

Primary Examiner—Rodney B. White
(74) Attorney, Agent, or Firm—Mark Sparschu, Esq.

(57) ABSTRACT

An adjustable height automotive seat (10) is provided, including a backrest portion (12) and a seat portion (14), the seat portion (14) capable of being vertically displaced in relation to the backrest portion (12) and thereby accommodating shorter passengers.

15 Claims, 3 Drawing Sheets

ADJUSTABLE HEIGHT AUTOMOTIVE SEAT

TECHNICAL FIELD

The present invention relates generally to an adjustable height automotive seat and more particularly to an adjustable height automotive seat with improved characteristics for accommodating variably-sized occupants.

BACKGROUND OF THE INVENTION

Automotive designers have discovered that the "one size fits all" mentality of traditional automotive design is no longer acceptable to many consumers. Design considerations, once dictated by a fictitious average-sized male, now must be flexible to accommodate a wider variety of body shapes and sizes. Although safety issues such as airbags, and other restraints, may have helped bring the issue of varied occupant size to the forefront, occupant comfort and convenience have helped drive improvements as well.

One aspect of automotive design that is ripe for improvement is an automotive seat design to accommodate varying occupant size. Automotive seats are often designed to accommodate an average-sized male occupant. In reality, however, the occupants using such a seat may be non-average males, women, and children. Often, such alternate occupants do not approach the height and size of an average male. When such an alternate occupant is seated in an automotive seat designed for an average adult male, several disadvantages may be realized.

One known disadvantage occurs primarily in automotive seats positioned within the rear of the vehicle. Often, occupants of smaller stature, when positioned in these seats, do not have clear lines of sight out of the vehicle's windows or to other vehicle passengers. This can serve to isolate these smaller statured occupants, reduce their enjoyment, and may even reduce family and communal experiences by hampering communication. Rather than placating children with personal entertainment devices such as video games, it would be more desirable to allow them to participate in the world passing by just outside the vehicle and to encourage their communication with other vehicle occupants.

In addition to the disadvantages stemming from reduced line of sight, smaller statured occupants can also be disadvantaged with regards to safety and comfort. Typical automotive seat design often does not allow such occupants proper leg and foot support. Often a smaller occupant cannot bend his or her legs and rest their feet on the floor. This can lead to discomfort during trips within the automobile. Of even more importance, current automotive seat design and corresponding safety belt design can result in submarining of smaller occupants during collisions. This can potentially result in a greater risk for physical injury during collision which is highly undesirable.

It would, therefore, be highly desirable to have an automotive seat with improved characteristics for accommodating alternate sized occupants. It would be highly desirable for such a seat to improve the travel experience of smaller statured occupants, increase their comfort, and improve their safety.

SUMMARY OF THE INVENTION

It is, therefore, an object of the present invention to provide an adjustable height automotive seat that improves the travel experience of smaller occupants within the automobile. It is a further object of the present invention to provide an adjustable height automotive seat with improved comfort and safety features for smaller occupants.

In accordance with the objects of the present invention, an adjustable height automotive seat is provided. The adjustable height automotive seat includes a backrest portion and a seat portion. The seat portion is vertically adjustable in relation to the backrest portion such that smaller occupants may sit at eye level with larger occupants within the vehicle.

Other objects and features of the present invention will become apparent when viewed in light of the detailed description of the preferred embodiment when taken in conjunction with the attached drawings and the appended claims.

DESCRIPTION OF THE PREFERRED EMBODIMENT(S)

Figure 1:
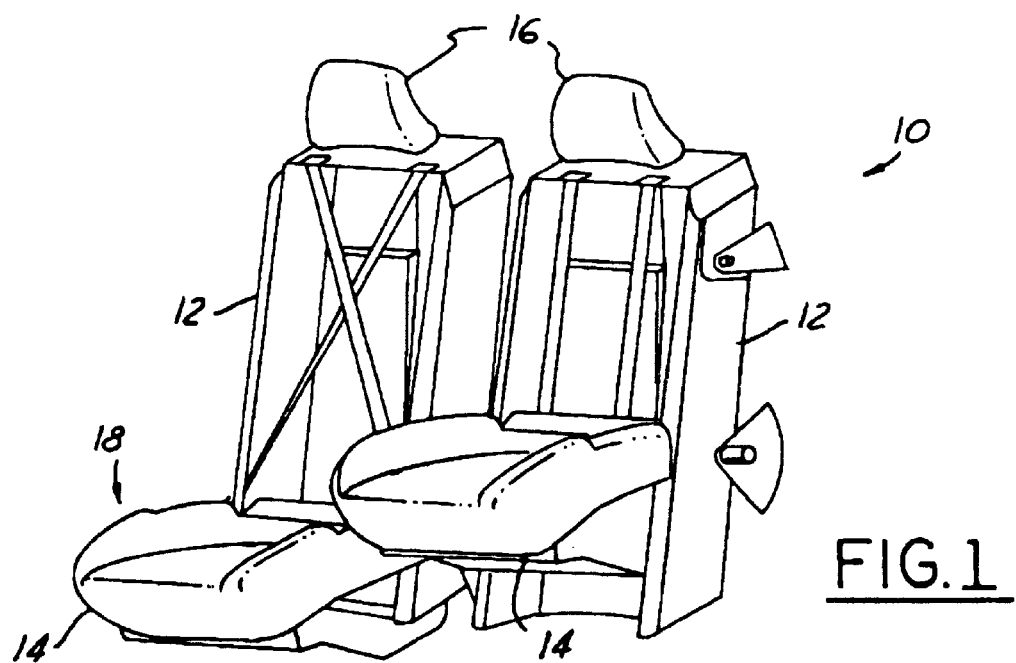
FIG. 1 is an illustration of an embodiment of an adjustable height automotive seat in accordance with the present invention.

Referring now to FIG. 1, which is an illustration of an adjustable height automotive seat 10 in accordance with the present invention. The adjustable height automotive seat 10 is intended for use as rear seating in an automobile, although front seating and non-automotive seating are contemplated. The adjustable height automotive seat 10 includes a backrest portion 12 and a seat portion 14. The seat portion 14 is vertically adjustable in relation to the backrest portion 12 in order to accommodate smaller vehicle occupants. By vertically adjusting the seat portion 14, smaller occupants can be provided with an improved line of sight outside the vehicle, improved eye contact with other vehicle occupants, and the opportunity to utilize normal automotive features, such as a headrest 16.

In one embodiment, the seat portion 14 may have a vertical displacement range of at least 50 mm from its base position 18. In another embodiment, the seat portion 14 is intended to have a vertical displacement range of at least 220 mm from its base position 18. Although two vertical displacement ranges have been described, it should be understood that a wide variety of vertical displacement ranges are contemplated.

Figure 2:
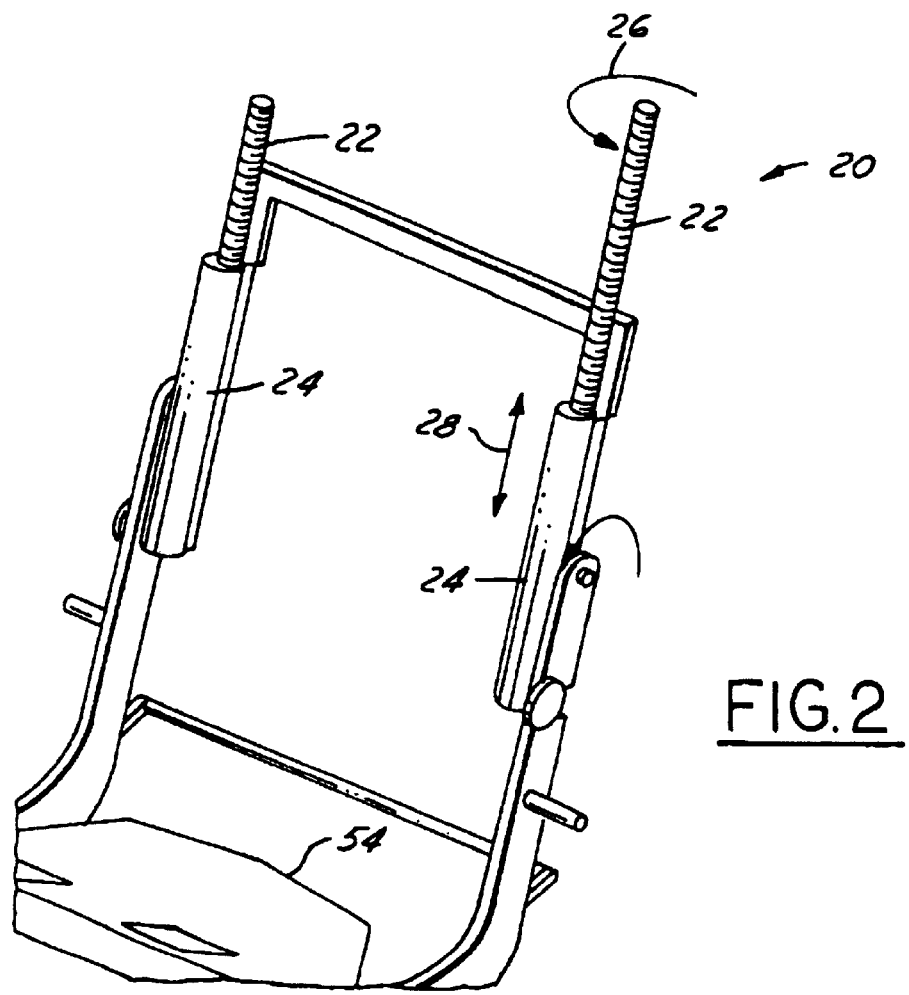
FIG. 2 is an illustration of an embodiment of the mechanical substructure for use in the adjustable automotive seat as shown in FIG. 1.
Figure 3:
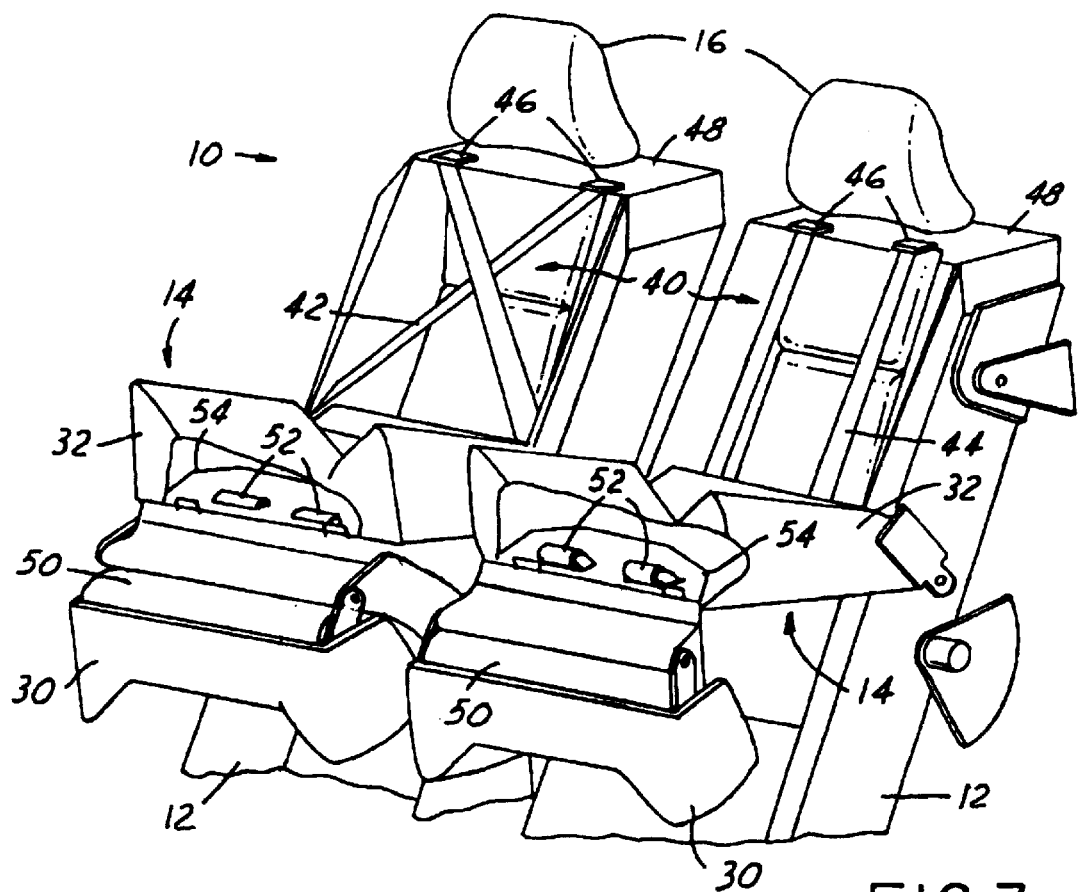
FIG. 3 is an embodiment of an adjustable height automotive seat in accordance with the present invention detailing comfort and safety features.

It is contemplated that the seat portion 14 may be raised and lowered to a variety of means both automated and non-automated. In one embodiment, illustrated in FIG. 2, a mechanical infrastructure 20, used to raise and lower the seat portion 14, includes a threaded portion 22 and a receiving portion 24. By rotating 26 the threaded portion 22, the receiving portion 24, which is mechanically attached to the seat portion 14, can travel in an approximately vertical direction 28 and thereby control the seat portion 14 position. Again, in some embodiments, this process is contemplated to be automated, while in other embodiments, manual adjustments are contemplated. It should be understood that the mechanical substructure 20 is provided only for illustrative purposes, and that a wide variety of structures capable of raising and lowering the seat portion 14 are contemplated.

Figure 4:
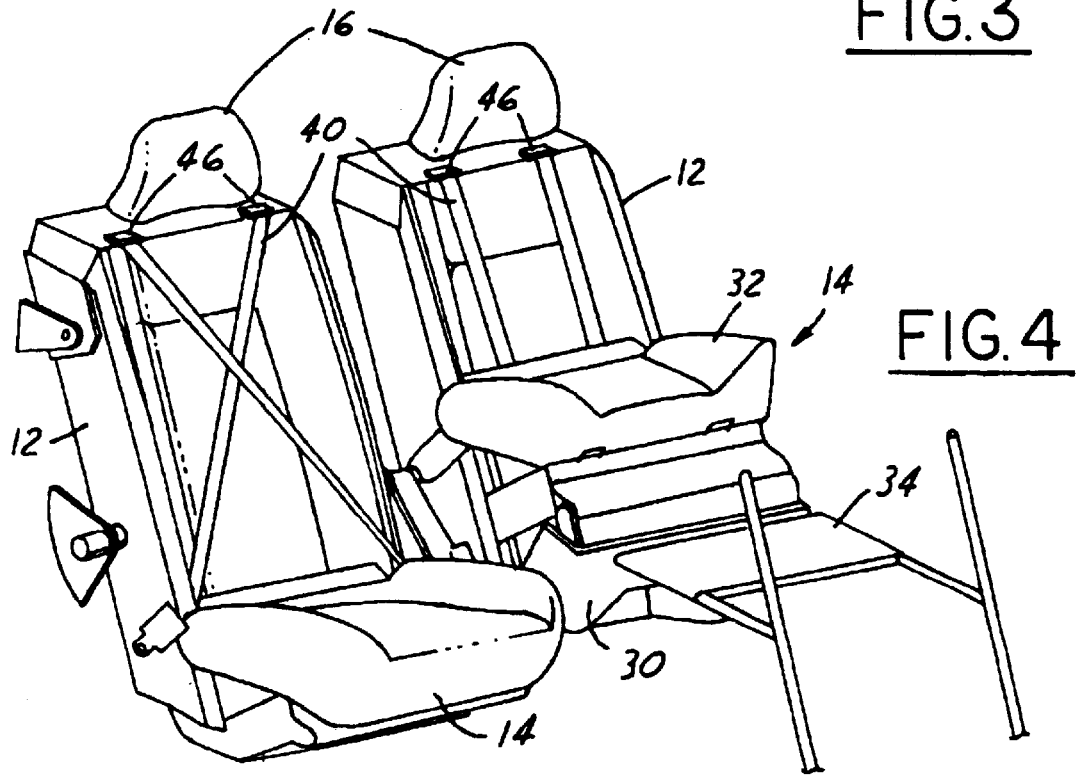
FIG. 4 is an alternate embodiment of an adjustable height automotive seat in accordance with the present invention detailing additional comfort features.

Although raising and lowering of the seat portion 14 provides greater accommodation to the varying sizes of occupants, additional improvements may be included in the present invention in order to further improve the comfort and safety of vehicle occupants. One such additional improvement includes creating a seat portion 14 with a front portion 30 and a rear portion 32. The front portion 30 is rotatably attached to the rear portion 32 such that the front portion 30 may be folded down and the rear portion 32 can then provide a more comfortable seating position for occupants, such as children, with short leg spans. In another embodiment, the adjustable height of the automotive seat 10 may further include an adjustable foot rest 34 (see FIG. 4) to further improve the comfort of smaller occupants.

Although comfort is an important aspect of automotive seat design, it should not eclipse safety concerns. The adjustable height of the automotive seat 10 is therefore envisioned to include one or more safety restraints 40. The safety restraint 40 may take on a variety of known configurations, such as a crisscross four point seatbelt 42 or a suspender four point seatbelt 44 as two examples. No matter what form the safety restraints 40 take, it is contemplated that such safety restraints 40 retract through guides 46 positioned on an upper portion 48 of the backrest portion 12. In this fashion, the safety restraints 40 are kept in proper geometry with respect to the occupant throughout all positions of the seat portion 14. By retracting safety restraints 40 into the backrest member 14, the seatbelt geometry automatically adapts as the seat portion 14 is moved. This increases both occupant convenience and comfort. In an alternate embodiment, it is contemplated that guides 46 may be positioned closer inboard to each other to help prevent the safety restraints 40 from gliding over a child's shoulder.

In combination with the safety restraints 40, a host of other safety features may be utilized. One category of such additional safety features are features designed to reduce submarining. Submarining, a circumstance often experienced by children during collisions, happens when during collision an occupant slides down and under the lap portion of the safety restraints 40. This is a dangerous condition that can put an occupant at risk. The present invention, therefore, contains several elements for reducing submarining. Once such element is a submarine protection tube 50 positioned within the front portion 30 of the seat portion 14. The submarine protection tube 50 provides some rigidity to the seat portion 14 to help reduce the sinking of an occupant during collision when the front portion 30 is folded up. When the front portion 30 is folded down, however, pop up protectors 52 are contemplated to supply the necessary rigidity to rear portion 32 required to reduce submarining. Furthermore, a sheet metal base 54 may additionally be used to provide support and reduce submarining. Although specific examples of anti-submarining elements 50, 52, 54 have been described, it should be understood that a wide variety of elements to prevent submarining are contemplated.

In addition to the safety restraints 40 and the submarine protection 50, 52, 54, additional characteristics are contemplated that may improve the safety of the present invention.

Figure 6:
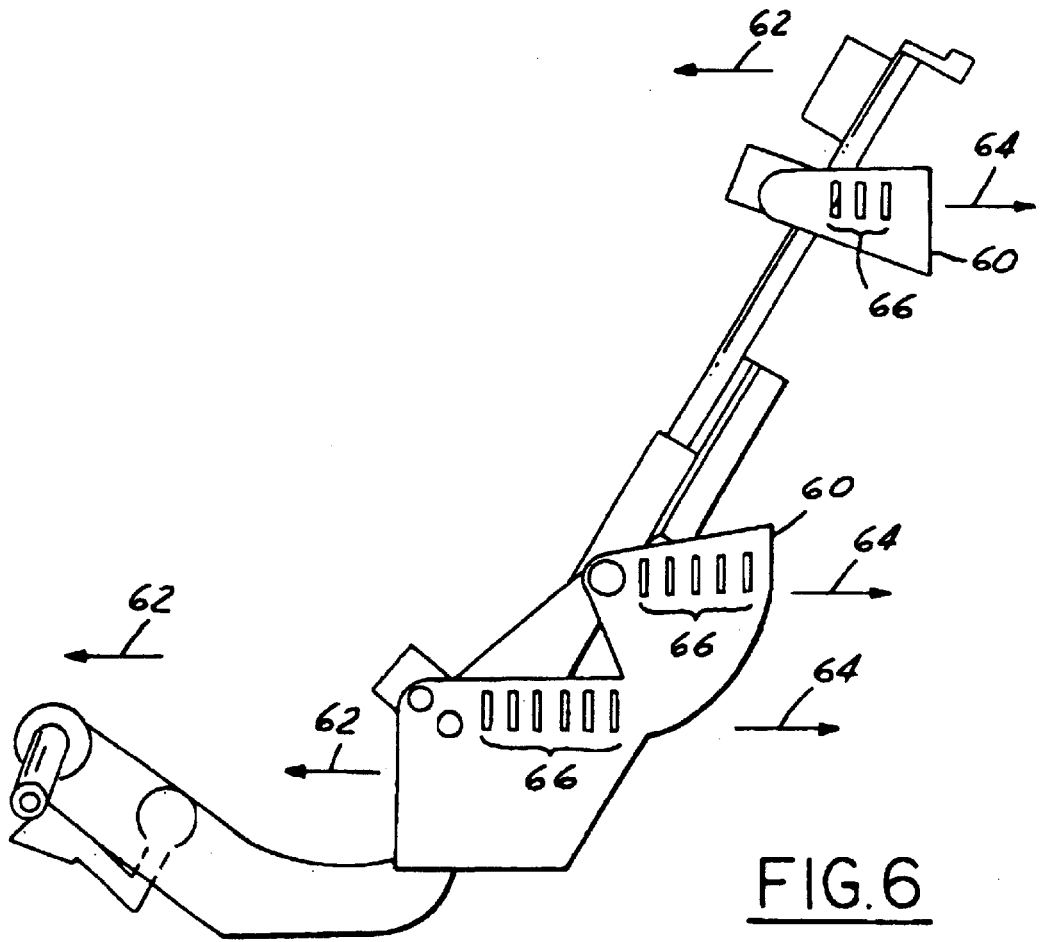
FIG. 6 is an illustration of an embodiment of the mechanical substructure for use in an adjustable height automotive seat in accordance with the present invention.

In one such embodiment (see FIG. 6), one-way collapsible brackets 60 may be used to mount the adjustable height automobile seat 10 to the automobile (not shown). One-way collapsible brackets 60 are useful in providing the structural rigidity necessary to secure the mechanical substructure 20 and thereby prevent the movable adjustable height automotive seat 10, from moving forward 62 during front end collisions. Such one-way collapsible brackets 60 also allow energy to be absorbed by collapsing during rear directional travel 64 during rear end collisions. The ability to absorb energy during rear end collisions helps reduce whiplash and other associated injuries. Although a variety of one-way collapsible brackets 60 are contemplated, in one embodiment, the one-way collapsible brackets 60 include gap portions 66 formed within the bracket that reduce the bracket's compressive strength while retaining its tensile strength. Although one embodiment of a one-way collapsible bracket 60 has been described, it should be understood that a wide variety of one-way collapsible brackets are contemplated by the present invention.

Figure 5:
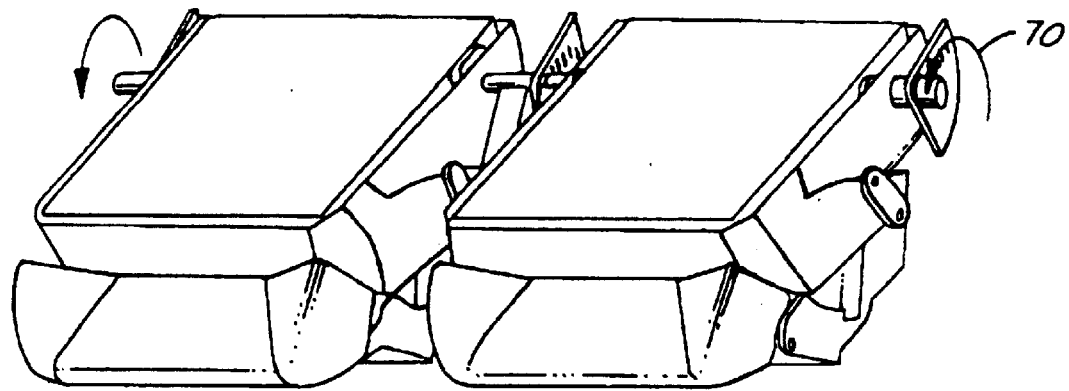
FIG. 5 is an illustration of an embodiment of an adjustable height automotive seat in accordance with the present invention detailing convenience features.

In addition to the novel convenience, comfort, and safety features introduced by the present invention, it is contemplated that traditional convenience and comfort features known and used in the prior art may be incorporated into the present invention to further enhance its desirability. One such convenience feature is a fold down feature 70 (see FIG. 5). Fold down features 70 are well-known features for increasing storage capacity when the seat is not in use. It is contemplated that the flip-down feature, as well as a wide variety of other conveniences known in the prior art may be incorporated to further improve the present invention.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An adjustable height automotive seat comprising:
   a backrest portion;
   a seat portion vertically adjustable in relation to said backrest portion; and
   at least one one-way collapsible bracket, said bracket intended to mount the seat within an automotive vehicle, said bracket having lesser compressive than tensile strength in order to facilitate energy absorption by said bracket in a rear-end collision with said vehicle while retaining strength to prevent said seat from moving forward during a front-end collision with said vehicle.

2. An adjustable height automotive seat as recited in claim 1, further comprising:
   a rotatable threaded portion in communication with said seat portion, whereby rotation of said threaded portion causes vertical displacement of said seat portion.

3. An adjustable height automotive seat as recited in claim 1, further comprising:
   at least one submarine tube element positioned within a front portion of said seat portion to provide rigidity to reduce sinking of an occupant seated in said seat portion during collision of a vehicle in which said seat is mounted.

4. An adjustable height automotive seat as recited in claim 1, wherein said one-way bracket includes a plurality of openings formed in a body portion thereof to help absorb forces transferred to the seat in the event of a rear-end collision with said vehicle.

5. An adjustable height automotive seat comprising:
   a backrest portion;
   a seat portion, including a rear portion and a front portion, said front portion rotatably attached to said rear portion such that said front portion may be folded down from said rear portion; and
   at least one submarine tube element positioned within a front portion of said seat portion to provide rigidity to reduce sinking of an occupant seated in said seat portion during collision of a vehicle in which said seat is mounted.

6. An adjustable height automotive seat as recited in claim 5, further comprising:
   at least one one-way collapsible bracket, said bracket intended to mount the seat within an automotive vehicle, said bracket having lesser compressive than tensile strength in order to facilitate energy absorption by said bracket in a rear-end collision with said vehicle while retaining strength to prevent said seat from moving forward during a front-end collision with said vehicle.

7. An adjustable height automotive seat as recited in claim 6, wherein said one-way bracket includes a plurality of openings formed in a body portion thereof to help absorb forces transferred to the seat in the event of a rear-end collision with said vehicle.

8. An adjustable height automotive seat as recited in claim 5, further comprising:
   a rotatable threaded portion in communication with said seat portion whereby rotation of said threaded portion causes vertical displacement of said seat portion.

9. An adjustable height automotive seat comprising:
   a backrest portion;
   a seat portion, including a rear portion and a front portion, said front portion rotatably attached to said rear portion such that said front portion may be folded down from said rear portion; and
   at least one one-way collapsible bracket, said bracket intended to mount the seat within an automotive vehicle, said bracket having lesser compressive than tensile strength in order to facilitate energy absorption by said bracket in a rear-end collision with said vehicle while retaining strength to prevent said seat from moving forward during a front-end collision with said vehicle.

10. An adjustable height automotive seat as recited in claim 9, further comprising:
    at least one submarine tube element positioned within a front portion of said seat portion to provide rigidity to reduce sinking of an occupant seated in said seat portion during collision of a vehicle in which said seat is mounted.

11. An adjustable height automotive seat recited in claim 9, further comprising:
    a rotatable threaded portion in communication with said seat portion, whereby rotation of said threaded portion causes vertical displacement of said seat portion.

12. An adjustable height automotive seat as recited in claim 9, wherein said one-way bracket includes a plurality of openings formed in a body portion thereof to help absorb forces transferred to the seat in the event of a rear-end collision with said vehicle.

13. An adjustable height automotive seat comprising:
    a backrest portion;
    a seat portion vertically adjustable in relation to said backrest portion; and
    at least one submarine tube element positioned within a front portion of said seat portion to provide rigidity to reduce sinking of an occupant seated in said seat portion during collision of a vehicle in which said seat is mounted;
    at least one one-way collapsible bracket, said bracket intended to mount the seat within an automotive vehicle, said bracket having lesser compressive than tensile strength in order to facilitate energy absorption by said bracket in a rear-end collision with said vehicle while retaining strength to prevent said seat from moving forward during a front end collision with said vehicle.

14. An adjustable height automotive seat as recited in claim 13 wherein said one-way bracket includes a plurality of openings formed in a body portion thereof to help absorb forces transferred to the seat in the event of a rear-end collision with said vehicle.

15. An adjustable height automotive seat as recited in claim 13, further comprising:
    a rotatable threaded portion in communication with said seat portion, whereby rotation of said threaded portion causes vertical displacement of said seat portion.

* * * * *